Nov. 19, 1968  J. H. BALTHIS, JR  3,411,890
CHEMICAL PRODUCTS AND PROCESSES
Filed July 11, 1962
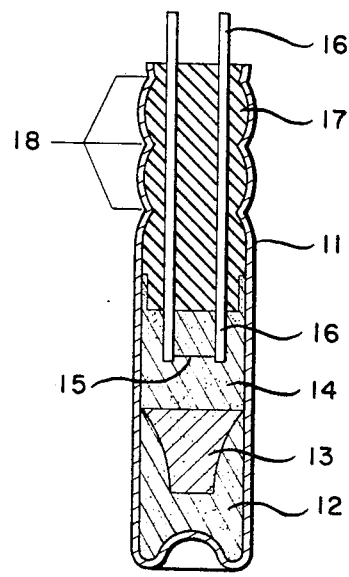
INVENTOR
JOSEPH H. BALTHIS, JR.
BY
ATTORNEY United States Patent Office 3,411,890
Patented Nov. 19, 1968

3,411,890
CHEMICAL PRODUCTS AND PROCESSES
Joseph H. Balthis, Jr., Mendenhall, Pa., assignor to E. I. du Pont de Nemours and Company, Wilmington, Del., a corporation of Delaware
Filed July 11, 1962, Ser. No. 209,487
9 Claims. (Cl. 23—358)

ABSTRACT OF THE DISCLOSURE

Double salts of cobalt(III) and chromium(III) ammines and decahydrodecaborate or dodecahydrododecaborate anions with a second anion which is oxidizing are useful as initiating explosives.

DESCRIPTION OF THE INVENTION

This invention relates to a new class of polyhydropolyborates and to processes for their preparation.

More particularly, the invention concerns salts comprising a cobalt or chromium ammine cation and anions of decahydrodecaborate or dodecahydrododecaborate and an inorganic oxidizing anion with a reduction potential of at least 0.5 volt.

Polyhydropolyborates are of increasing importance in the field of explosives, but there are no known polyhydropolyborates which can function in electric blasting caps simultaneously as a base charge, primer charge and/or ignition charge. Indeed, few compounds exhibit this combination of functions, for example, mercury fulminate. There have now been discovered a novel class of polyhydropolyborate salts having the desired combination of properties.

The products of this invention are salts containing:

(a) One of two ammine cations (cationic ammines) of hexacoordinated, trivalent cobalt or chromium, with at least five of the six coordination positions of the cobalt or chromium being occupied by ammonia or amines bonded to the central metal atom through nitrogen, the remaining coordination position, if any, being occupied by water or an anion of the type defined in (c) below;

(b) One decahydrodecaborate or dodecahydrododecaborate anion; and (c) At least one inorgaic oxidizing anion having a reduction potential of 0.5 v. or greater. This anion, or one of these anions, can be coordinated to the cobalt or chromium as stated above.

The invention also includes hydrates of these salts.

The highest possible total positive charge (i.e., the sum of the positive charges on the cation or cations) of any one of the compounds defined above is six, this value being realized when there are two trivalent cations as described in (a) above. Since there is present in each compound one $B_{10}H_{10}^=$ or $B_{12}H_{12}^=$ anion, with a negative charge of two, and since the total positive and negative charges must be equal, it will be seen that the greatest possible number of anions described in (c) above is four, and this only when each of the four carries a single negative charge.

The compounds of the invention can be represented by the formula $$[ML_{6-n-p}(H_2O)_n(A)_p]_s(B_qH_q)(A)_r$$

where M is cobalt (III) or chromium (III), i.e., trivalent cobalt or chromium; L is a nitrogen-containing ligand bonded coordinately through nitrogen to M and defined in more detail below; A is an inorganic anion as defined in paragraph (c) above; $n$ and $p$ are 0 or 1 with the sum of $n$ and $p$ at most 1; $s$ is 1 or 2; $q$ is 10 or 12; and $r$ is a cardinal whole number of 0–4, inclusive. The value of $r$ is determined by the number of cations ($s$), the number of anions A within the coordination sphere of each cation ($p$), and the valence of the anion A ($a$), the relationship being $$r = \frac{s(3-pa)-2}{a}$$

In the formula it is understood that the magnitude of the positive charge on each cation is $(3-pa)$, the magnitude of the negative charge on the $B_qH_q$ anion is 2, and the magnitude of the negative charge on the anion A is $a$.

The utility of the products of the invention is illustrated by the drawing which demonstrates the use of the products in blasting caps. The drawing will be more fully explained in the portion of the specification relating to utility.

COMPONENTS OF THE PRODUCTS

A. The ammine cation

One component of each of the products of this invention is a cobalt(III) or chromium(III) ammine cation of the type defined above. Cobalt(III) and chromium (III) ammine cations are a much-studied and well-recognized group, as are the nitrogen compounds that can function as ligands coordinated to the central metal atoms therein. See, for example, Mellor's "Comprehensive Treatise on Inorganic and Theoretical Chemistry," vol. XI, page 400, and vol. XIV, page 690 (Longmans, 1935), and Sidgwick's "Chemical Elements and Their Compounds," pages 1014, 1016, and 1399–1400 (Oxford, 1950). Nitrogen compounds that can function as ligands include ammonia; monoprimary amines (e.g., ethylamine, allylamine, benzylamine, and aniline); heterocyclic monoamines (e.g., pyridine); saturated acyclic 1,2- and 1,3-diprimary amines of 2–5 carbons (e.g., ethylenediamine, 1,2-propanediamine, 1,3-propanediamine, 2,3-butanediamine, and 2,4-pentanediamine); saturated alicyclic 1,2-diprimary amines (e.g., 1,2-cyclopentanediamine and 1,2-cyclohexanediamine); aromatic 1,2-diprimary amines (e.g., o-phenylenediamine); heterocyclic 1,2-ditertiary amines (e.g., 2,2'-bipyridyl and o-phenanthroline); and saturated, aliphatic, straight-chain polyamines (e.g., 1,2,3-propanetriamine and triethylenetetramine). More than one of the above species of ligands can be present in a single cobalt(III) or chromium(III) ammine cation, i.e., cations such as bis(ethylenediamine) (1,2-propanediamine)chromium(III), (Cren$_2$pn)$^{+++}$, and amminebis(ethylenediamine)pyridinecobalt(III), $$(CoNH_3en_2py)^{+++}$$

are known. When one of the above diamines is present as a ligand, both amino groups can be bonded to the central metal atom in a chelate structure. Cobalt(III) and chromium(III) ammines in which one coordination position is occupied by water or by an anion of the type defined under (c) above are well known. Examples are [Co(NH$_3$)$_5$H$_2$O]$^{+++}$ and [Cr(NH$_3$)$_5$NO$_3$]$^{++}$.

Thus, L in the formula definition can be the same or different and represents ammonia, a monoprimary amine, or a heterocyclic monoamine; furthermore, any two L's can together represent a saturated acyclic 1,2- or 1,3-diprimary amine of 2–5 carbon atoms, a saturated alicyclic 1,2-diprimary amine, an aromatic 1,2-diprimary amine, or a heterocyclic 1,2-ditertiary amine; also any three L's can together represent a saturated, aliphatic, straight-chain triamine, and any four L's taken together can represent a saturated, aliphatic, straight-chain tetramine.

For reasons of availability of starting materials and stability, cations in which the coordinated nitrogen-containing ligands are ammonia, saturated acyclic 1,2-diprimary amines of 2–5 carbons, o-phenylenediamine, 2,2'- bipyridyl, or o-phenanthroline are preferred. The diamines of this preferred group, which by definition have their amino nitrogens bonded to adjoining carbons, give especially stable ammine cations, by virtue of the fact that they can form chelates containing five-membered rings with the central metal atom, for example, as in the tris(ethylenediamine)cobalt(III) cation:

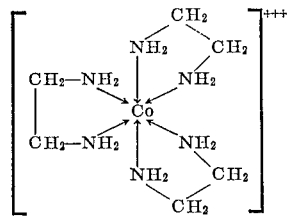

Stabilization of chromium(III) and cobalt(III) ammine cations by chelation is described on pages 1016 and 1400 of Sidgwick. The general subject of chelation, and more particularly the formation of stable compounds involving metal atoms or ions and 1,2-diamines, is familiar to those skilled in the art and is discussed at length in many references, for example, Parry in "Chemistry of the Coordination Compounds" (ed. Bailar), pages 221, 227 ff. (Reinhold, 1956), and Moeller, "Inorganic Chemistry," page 237 ff. (Wiley, 1952).

Because of ease of preparation, cations in which all the coordinated nitrogen-containing ligands are the same are preferred. Ammonia, ethylenediamine, and 1,2-propanediamine are especially preferred as ligands for economic reasons, ammonia being the most preferred.

B. The polyhydropolyborate anion

A second component of each of the products of this invention is of polyhydropolyborate anion, specifically, a $B_{10}H_{10}^=$ or a $B_{12}H_{12}^=$ anion. These anions are two relatively new types of polyhydropolyborates and procedures for preparing typical compounds containing them, which are used as reactants in the process of the present invention, are given below.

Ammonium decahydrodecaborate $[(NH_4)_2B_{10}H_{10}]$, one source of the $B_{10}H_{10}^=$ ion, can be prepared in quantitative yield by the reaction of a decaboryl bis(lower dialkyl sulfide), e.g., decaboryl bis(dimethyl sulfide), $$B_{10}H_{12}[(CH_3)_2S]_2$$

with liquid ammonia at a temperature between about −50° C. and 0° C. The product is isolated simply by evaporating any excess unreacted ammonia. This process is described in detail in U.S. 3,148,938, issued in the name of W. H. Knoth, Jr. The decaboryl bis(lower dialkyl sulfide) is prepared by allowing decaborane, $B_{10}H_{14}$, to react with a lower dialkyl sulfide at a temperature of at least 0° C., and preferably at least 25° C., until approximately one mole of hydrogen per mole of decaborane is evolved. This process is described in detail in U.S. 3,154,561, issued in the name of E. L. Muetterties.

Alkali-metal salts of $H_2B_{10}H_{10}$, another source of the $B_{10}H_{10}^=$ anion, can be prepared by converting $$(NH_4)_2B_{10}H_{10}$$

into $H_2B_{10}H_{10}$ through acidic cation-exchange, and neutralizing the aqueous solution of the acid with the appropriate metal hydroxide. The metal salts can then be recovered by evaporating the water. These processes are described in detail in U.S. 3,148,939, issued in the name of W. H. Knoth, Jr.

Any alkali-metal salt of $H_2B_{12}H_{12}$, a source of the $B_{12}H_{12}^=$ anion, can be prepared by the reaction of the appropriate alkali-metal hydroborate, e.g., $NaBH_4$, with diborane in the presence of an ether such as ethyl ether or 1,2-dimethoxyethane. The process should be carried out in a closed system at a temperature of at least 100° C. and a pressure of at least three atmospheres. The product can be recrystallized from ethers such as ethyl ether or tetrahydrofuran or mixtures thereof and any organic solvate of crystallization can be removed by mixing the product with water and distilling out the organic solvate. The product is isolated by evaporation, and the salt is obtained as a monohydrate, e.g., $Na_2B_{12}H_{12} \cdot H_2O$, which can absorb water from the atmosphere to form the dihydrate $Na_2B_{12}H_{12} \cdot 2H_2O$. Alternatively, the dihydrate can be obtained by stopping the evaporation at an earlier stage.

The free acid $H_2B_{12}H_{12}$ can be prepared by bringing an aqueous solution of the alkali metal salt into contact with an acidic cation-exchange resin. The process leads to an aqueous solution of the free acid, which can be neutralized with ammonium hydroxide to give a solution of the ammonium salt, $(NH_4)_2B_{12}H_{12}$. The latter can be isolated by evaporation. All these processes are described in detail in U.S. 3,169,045, issued in the name of H. C. Miller and E. L. Muetterties.

C. The oxidizing anion

A third component of each of the products of this invention is an inorganic anion having a reduction potential of at least 0.5 v., defined as A in the formula. Reduction potential is defined in terms of oxidation potential in Glasstone, "Textbook of Physical Chemistry," pages 939–940 (Van Nostrand, 1946). From this and the discussion of oxidation potential in Moeller, pages 284–290, it is clear that reduction potential measures the relative ease with which an oxidant in an electrode reaction is reduced, i.e., its oxidizing power. Single electrode potentials for various reduction reactions are given in Lange's "Handbook of Chemistry," 8th edition, beginning on page 1244 (Handbook Publishers, Inc., 1952). From the discussion in Glasstone and Moeller, it is clear that the values in the column headed "$E°_{red}$" in the table in Lange are reduction potentials.

For reasons of availability, preferred anions are those derived from oxy-acids of elements of Groups V–A, VI–B, VII–A and VII–B of the Periodic Table, contained in Deming's "General Chemistry," 5th ed., p. 156, John Wiley, 1944. The preferred oxy-acid anions include nitrate, chromate, dichromate, permanganate, hypochlorite, chlorite, chlorate, bromate, iodate, perchlorate, and periodate anions. Nitrate, chromate, and perchlorate anions are especially preferred, nitrate being the most preferred for economic reasons.

Preparation of the products

The products of this invention can be made by one or either of two processes:

Process I.—A cobalt(III) or chromium(III) ammine salt containing as its only anion or anions one or more anions of reduction potential of at least 0.5 v., in which the cation and anion are both as described in detail above, is reacted with a soluble salt containing as its only anion the $B_{10}H_{10}^=$ or $B_{12}H_{12}^=$ anion, e.g., an ammonium or alkali metal salt, in neutral or acidic aqueous solution. The structure of the cobalt(III) or chromium(III) ammine salt is formulated as $$[ML_{6-n-p}(H_2O)_n(A)_p]_a(A)_{3-pa}$$

and the polyhydropolyborate salts as $M'_2B_qH_q$ wherein $M'$ is ammonium or alkali metal and the remaining terms are defined as above. For economic reasons, sodium, potassium, and ammonium salts are preferred. The cobalt(III) or chromium(III) salt can contain more than one type of anion of reduction potential of at least 0.5 v., e.g., both chromate and nitrate anions, and hydrates of any of the reactants can be used.

Process II.—A cobalt(III) or chromium(III) ammine salt containing as its only anion one or more $B_{10}H_{10}^=$ or $B_{12}H_{12}^=$ anions $([ML_{6-n-p}(H_2O)_nA_p]_u(B_qH_q)_v$ wherein $u$ and $v$ are the smallest whole numbers that satisfy the equation $$v = \frac{u(3-pa)}{2}$$

and the other terms are defined as previously) is reacted with a soluble salt containing as its only anion an ion of reduction potential of at least 0.5 v., e.g., an ammonium or alkali-metal salt, $(M'_aA)$ in neutral or acidic aqueous solution. Again, hydrates of any of the reactants can be used.

Process I is preferred, because it does not require the preparation of a complex cobalt or chromium polyhydropolyborate as an intermediate. When the anion defined under (c) above is monovalent, Process I generally leads to a product containing two cobalt or chromium ammine cations when the nitrogen-containing ligand coordinated to the cobalt or chromium is ammonia, and to a product containing one cobalt or chromium ammine cation when the nitrogen-containing ligand is a larger molecule such as a 1,2-diamine. Process II generally leads to a product containing one cobalt or chromium ammine cation.

In neither process is the mole ratio of reactants, weight ratio of solvent to reactants, temperature, pressure, or reaction time critical. Usually the approximate mole ratio of reactants dictated by the stoichiometry of the reaction is used. Enough water to dissolve both reactants is ordinarily used. Since the solubility of the reactants varies considerably, solvent/reactant ratio may be as low as 1/1 or as high as 100/1 or even higher. Ordinarily, it is between 2/1 and 10/1. Alternatively, a partial solution of a reactant of relatively low solubility can be used.

The temperature is governed principally by the solubilities of the reactants and the stability of the product in the presence of water. For reactants with high solubilities and products stable to hot water, the temperature is limited only by the freezing point and the boiling point of water, with the preferred range being 20–90° C. For convenience, room temperature (20–30° C.) is ordinarily used. The solubilities of many reactants that are not highly soluble at room temperature, and the solubilities of many of the products, are increased advantageously by raising the temperature to 60–90° C. For products that react with hot water, e.g., compounds containing the $Cr(NH_3)_6^{+++}$ cation (Sidgwick, page 1017), relatively low temperatures are used if products containing all the original nitrogen-containing ligands, e.g., the six $NH_3$ groups of $Cr(NH_3)_6^{+++}$, in the cation are desired.

The products usually precipitate immediately when the reactants are mixed, or as soon as the reaction mixture is cooled to room temperature. In a few cases, the products may require several hours to crystallize from solution. The products can be separated by filtration or centrifugation and purified by recrystallization from water. Products that are obtained as hydrates can be partially or completely dehydrated by wellknown methods, e.g., heating under reduced pressure in the presence of a drying agent.

Properties of the products

The products are colored crystalline solids that explode on being struck or on being heated strongly. They are all at least slightly soluble in water and largely insoluble in organic solvents.

The following examples illustrate the products and processes of this invention.

EXAMPLE I

Hexamminecobalt(III) dodecahydrododecaborate nitrate dihydrate

An aqueous solution of $[Co(NH_3)_6](OH)_3$ was prepared by passing 0.13 molar $[Co(NH_3)_6]Cl_3$ ("Inorganic Syntheses, vol. II, p. 217 (McGraw-Hill, 1946)) through the hydroxide form of a strongly basic anion-exchange resin. $[Co(NH_3)_6]_2(B_{12}H_{12})_3 \cdot 6H_2O$ was prepared by neutralizing an aqueous solution of the $$[Co(NH_3)_6](OH)_3$$

with 0.2-molar $H_2B_{12}H_{12}$, and concentrating the solution under reduced pressure at 25° C., whereupon the product crystallized. It was recrystallized from water at 60–65° C.

Analysis.—Calcd. for $[Co(NH_3)_6]_2(B_{12}H_{12})_3 \cdot 6H_2O$: B, 45.50; Co, 13.77; H, 9.89; N, 19.63. Found: B, 44.58; Co, 14.10, 14.14; H, 9.62; N, 20.14, 20.14.

A solution of 1.7 g. of $[Co(NH_3)_6]_2(B_{12}H_{12})_3 \cdot 6H_2O$ in 5 ml. of water was mixed with a solution of 0.34 g. of $NaNO_3$ in 1 ml. of water at room temperature. A solid precipitated immediately. It was dissolved by adding 7 ml. of water and heating the mixture to about 80° C. On cooling, orange crystals of hexamminecobalt(III) dodecahydrododecaborate nitrate dihydrate, $$[Co(NH_3)_6](B_{12}H_{12})(NO_3) \cdot 2H_2O$$

appeared, and were separated by filtration, washed with cold water, and dried. The yield was approximately one gram. The infrared absorption spectrum of the product (mineral-oil mull) had bands at $4.0\mu$ (B–H); $9.4\mu$ ($B_{12}H_{12}^=$); $3.0\mu$, $6.2\mu$, and $7.5\mu$ ($NH_3$); and $7.3-7.5\mu$ and $12.1\mu$ ($NO_3^-$). Recrystallization from 6.7 g. of water did not change the infrared absorption spectrum; the nitrogen content of the product was also essentially unchanged, being 24.34% before recrystallization and 24.27% after (calculated, 24.46%).

A second sample of the product prepared essentially as described above was analyzed more completely:

Analysis.—Calcd. for $$[Co(NH_3)_6](B_{12}H_{12})(NO_3) \cdot 2H_2O$$

B, 32.37; Co, 14.69; N, 24.45. Found: B, 32.32; Co, 14.96; N, 24.58, 24.74.

The product exploded when struck sharply or when heated to several hundred degrees centigrade.

EXAMPLE II

Di[hexamminecobalt(III)] dodecahydrododecaborate tetranitrate tetrahydrate $[Co(NH_3)_6](NO_3)_3$ was prepared by the method of "Inorganic Syntheses," vol. II, p. 218 (McGraw-Hill, 1946).

A solution of 8.96 g. of $Na_2B_{12}H_{12} \cdot 2H_2O$ in 10 ml. of water was added to a partial solution of 13.89 g. of $[Co(NH_3)_6](NO_3)_3$ in 100 ml. of water with stirring at 70° C. Addition of 35 ml. of water and heating to 90° C. gave a complete solution. The solution was cooled, and the orange crystals that formed were worked up by the method of Example I. The yield was 12.65 g. Two recrystallizations from water at 70° C. gave 6.88 g. of deep-orange, semitransparent needles of di[hexamminecobalt(III)] dodecahydrododecaborate tetranitrate tetrahydrate, $[Co(NH_3)_6]_2(B_{12}H_{12})(NO_3)_4 \cdot 4H_2O$.

Analysis.—Calcd. for $$[Co(NH_3)_6]_2(B_{12}H_{12})(NO_3)_4 \cdot 4H_2O$$

B, 16.56; Co, 15.03; N, 28.58. Found: B, 17.17; Co, 14.36, 14.45, 14.51; N, 29.30, 29.03.

The infrared absorption spectrum of the product had bands corresponding to $NH_3$, $H_2O$, $NO_3^-$, and $B_{12}H_{12}^=$. The product exploded when struck by a hammer on a hard surface and flashed when dropped on a heated surface.

EXAMPLE III

Di[hexamminecobalt(III)] dodecahydrododecaborate tetranitrate dihydrate $[Co(NH_3)_6]_2(B_{12}H_{12})(NO_3)_4 \cdot 4H_2O$ prepared in Example II was heated for 24 hours at 100° C. and 0.01–0.02 mm. pressure over phosphorus pentoxide. An essentially quantitative yield of di[hexamminecobalt(III)] dodecahydrododecaborate tetranitrate dihydrate, $$[Co(NH_3)_6]_2(B_{12}H_{12})(NO_3)_4 \cdot 2H_2O$$

was realized (calculated weight loss, 4.59%; found, 4.35%). This product was qualitatively more sensitive to shock (exploded more readily when struck by a hammer) than the tetrahydrate.

EXAMPLE IV

Di[pentammineaquochromium(III)] dodecahydrododecaborate tetranitrate $[Cr(NH_3)_6](NO_3)_3$ was prepared by the method of "Inorganic Syntheses," vol. III, p. 153 (McGraw-Hill, 1950).

A mixture of 8.0 g. of $[Cr(NH_3)_6](NO_3)_3$, 6.71 g. of $Na_2B_{12}H_{12} \cdot 2H_2O$, and 55 ml. of water was heated with agitation to 70° C., four drops of concentrated nitric acid being added during the process. At 70° C. a complete solution resulted. The crystals that formed on cooling were worked up by the method of Example I to give 5.78 g. of di[pentammineaquochromium(III)] dodecahydrododecaborate tetranitrate, $$[Cr(NH_3)_5(H_2O)]_2(B_{12}H_{12})(NO_3)_4$$

Recrystallization from 45 ml. of water at 60° C. gave 4.21 g. of the product in the form of orange-yellow crystals that exploded when struck sharply or when dropped onto a hot surface.

*Analysis.*—Calcd. for $$[Cr(NH_3)_5(H_2O)]_2(B_{12}H_{12})(NO_3)_4$$

B, 18.54; Cr, 14.85; N, 28.00. Found: B, 17.96; Cr, 15.03, 15.38; N, 28.15, 28.34.

The corresponding $[Cr(NH_3)_6]^{+++}$ compound, di[hexamminechromium(III)] dodecahydrododecaborate tetranitrate, can be prepared by carrying out the reaction at room temperature in more dilute solution. Alternatively, the product of the foregoing example can be made directly from $[Cr(NH_3)_5(H_2O)](NO_3)_3$ as the chromium-containing reactant.

EXAMPLE V

Di[hexamminecobalt(III)] decahydrodecaborate tetranitrate

A solution of 6.17 g. of $(NH_4)_2B_{10}H_{10}$ in 10 ml. of water was made acid with dilute nitric acid and added to a solution of 13.89 g. of $[Co(NH_3)_6](NO_3)_3$ in 155 ml. of water at 67° C. Warming the mixture to 75° C. gave a complete solution. On cooling, deep-orange, transparent crystals of di[hexamminecobalt(III)] decahydrodecaborate tetranitrate, $[Co(NH_3)_6]_2(B_{10}H_{10})(NO_3)_4$, precipitated and were worked up by the method of Example I. The yield was 11.55 g. Recrystallization from 130 ml. of water at 70° C. gave 8.03 g. of product, which was recrystallized once more from water for analysis.

*Analysis.*—Calcd. for $[Co(NH_3)_6]_2(B_{10}H_{10})(NO_3)_4$: B, 14.95; Co, 17.11; N, 32.74. Found: B, 14.73; Co, 16.96, 16.75; N, 31.65, 31.37.

The infrared absorption spectrum of the product (mineral-oil mull) remained essentially unchanged by the recrystallizations. The product exploded when struck by a hammer on a hard surface and flashed when dropped on a hot surface.

EXAMPLE VI

Di[nitratopentamminechromium(III)] decahydrodecaborate dinitrate

A solution of 6.17 g. of $(NH_4)_2B_{10}H_{10}$ in 10 ml. of water was acidified with 0.5 ml. of 1.6 N nitric acid and added to a solution of 13.61 g. of $[Cr(NH_3)_6](NO_3)_3$ in 140 ml. of water at 57° C. Adding 10 ml. of water and warming to 65° C. gave a complete solution. On cooling, transparent, orange-yellow, plate-like crystals of di[nitratopentamminechromium(III)] decahydrodecaborate dinitrate $$[Cr(NH_3)_5NO_3]_2(B_{10}H_{10})(NO_3)_2$$

separated and were worked up by the method of Example I. The yield was 10.2 g. Recrystallization from 135 ml. of water at 60° C. gave 7.36 g. of product.

*Analysis.*—Calcd. for $$[Cr(NH_3)_5NO_3]_2(B_{10}H_{10})(NO_3)_2$$

B, 16.89; Cr, 16.24; N, 30.61. Found: B, 17.40; Cr, 15.40, 15.20; N, 29.79, 29.48.

Hexacoordination of the chromium atoms in this product also may be attained by bridging of the chromium atoms through the $B_{10}H_{10}^=$ anion, in which case the product would be formulated as $$[(NH_3)_5Cr-B_{10}H_{10}-Cr(NH_3)_5](NO_3)_4$$

It is also possible that the chromium atoms are pentacoordinated, in which case the product would be formulated as $[Cr(NH_3)_5(B_{10}H_{10}(NO_3)_4$.

The product exploded when struck sharply with a hammer on a hard surface or when dropped on a heated surface, and was sensitive to light.

EXAMPLE VII

Tris(ethylenediamine)cobalt(III) decahydrodecaborate nitrate dihydrate $(Coen_3)(NO_3)_3$, a known compound, was prepared by air oxidation of an acqueous solution of cobalt(II) nitrate, ethylenediamine, and ethylenediamine nitrate. This is a well-known method for preparing complex cobalt(III) salts from cobalt(II) salts. See for example. "Inorganic Syntheses," vol. II, page 221 (McGraw-Hill, 1946).

A solution of 1.54 g. of $(NH_4)_2B_{10}H_{10}$ in 3 ml. of water was added to a solution of 4.25 g. of $$(Coen_3)(NO_3)_3$$

in 6 ml. of water at 80° C. On cooling, tris(ethylenediamine)cobalt(III) decahydrodecaborate nitrate dihydrate, $(Coen_3)(B_{10}H_{10})(NO_3) \cdot 2H_2O$, separated in yellow needles. The yield was 3.16 g. The product was recrystallized from 15 ml. of water at 80° C. for characterization.

*Analysis.*—Calcd. for $$[Co(NH_2CH_2CH_2NH_2)_3](B_{10}H_{10})(NO_3) \cdot 2H_2O$$

B, 23.75; Co, 12.94; N, 21.52. Found: B, 25.07; Co, 12.25, 12.01, 12.48, 12.10; N, 22.64, 22.88, 23.17.

The product exploded on contact with concentrated nitric acid. A piece of filter paper impregnated with the product from aqueous solution and dried flashed violently when touched with a free flame.

EXAMPLE VIII

Tris(ethylenediamine)cobalt(III) decahydrodecaborate nitrate monohydrate $(Coen_3)(B_{10}H_{10})(NO_3) \cdot 2H_2O$ was prepared as described in Example VII and dehydrated for 16 hours over phosphorus pentoxide at 25° C. and less than 0.01 mm. pressure. This treatment resulted in a 3.8% loss in weight, corresponding to removal of one mole of water, to give tris(ethylenediamine)cobalt(III) decahydrodecaborate nitrate monohydrate.

$$(Coen_3)(B_{10}H_{10})(NO_3) \cdot H_2O$$

Analysis.—Calcd. for $$[Co(NH_2CH_2CH_2NH_2)_3](B_{10}H_{10})(NO_3) \cdot H_2O$$

C, 16.47; H, 8.29; B, 24.73; Co, 13.47; N, 22.41. Found: C, 16.67, 16.19, 16.50; H, 8.85, 8.64, 8.10; B, 24.97, 24.79; Co, 13.61, 13.38; N, 23.41, 23.67.

Subsequent treatment of the product at 100° C. and less than 0.01 mm. pressure over phosphorus pentoxide for 23 hours did not remove any significant additional amount of water. The infrared absorption spectrum of the product was essentially the same as that of the dihydrate of Example VII. The product was more sensitive to shock, however, than the dihydrate, as judged by the ease with which it exploded when struck by a hammer.

EXAMPLE IX

Di[hexamminecobalt(III)] decahydrodecaborate bischromate $[Co(NH_3)_6](NO_3)(CrO_4)$ was prepared by the method described for the preparation of $[Co(NH_3)_6]_2(CrO_4)_3$ in Gmelin's "Handbuch der Anorganischen Chemie," 8 Auflage 58, Bd. XVIII, p. 68. The product was recrystallized twice before analysis. It was shown to have the indicated structure, rather than that reported in Gmelin, by its analysis and infrared absorption spectrum.

*Analysis.*—Calcd. for $Co(NH_3)_6(NO_3)(CrO_4)$: Co, 17.38; Cr, 15.34; N, 28.91. Found: Co, 18.18, 18.06; Cr, 15.06, 14.95; N, 28.90, 28.88.

The presence of a nitrate group was confirmed by absorption in the vicinity of $7.3\mu$ and sharp absorption at $12.1\mu$ in the infrared.

A solution of 5.36 g. of $[Co(NH_3)_6](NO_3)(CrO_4)$ in 510 ml. of water was prepared by heating the water to 90° C. and then adding the cobalt compound. Addition of a solution of 1.85 g. of $(NH_4)_2B_{10}H_{10}$ in 5 ml. of water to the hot solution caused immediate precipitation of a shiny, orange-yellow solid, which was worked up by the method of Example I to give 5.39 g. of di-[hexamminecobalt(III)]decahydrodecaborate bischromate, $[Co(HN_3)_6]_2(B_{10}H_{10})(CrO_4)_2$.

*Analysis.*—Calcd. for $[Co(HN_3)_6]_2(B_{10}H_{10})(CrO_4)_2$: B, 16.09; Co, 17.53; Cr, 15.47; N, 24.99. Found: B, 16.59; Co, 18.28, 18.44; Cr, 15.22, 15.20; N, 24.99, 24.92.

The product exploded when struck sharply with a hammer on a hard surface and flashed explosively when treated with concentrated nitric acid or dropped on a hot surface.

EXAMPLE X

Tris(2,2'-bipyridyl)cobalt(III) decahydrodecaborate perchlorate $(Cobipy_3)(ClO_4)_3 \cdot 3H_2O$ (bipy=2,2' - bipyridyl) was prepared by the method of Burstall and Nyholm, J. Chem. Soc. 1952, 3578.

A solution of 1.05 g. of $(NH_4)_2B_{10}H_{10}$ in 2 ml. of water was added to a solution of 6.0 g. of $$(Cobipy_3)(ClO_4)_3 \cdot 3H_2O$$

in 55 ml. of water at 80° C. The hot solution was rapidly cooled, whereupon a reddish-brown solid precipitated. The latter was worked up by the method of Example I to give 4.92 g. of tris(2,2'-bipyridyl)cobalt(III) decahydrodecaborate perchlorate, $(Cobipy_3)(B_{10}H_{10})(ClO_4)$.

*Analysis.*—Calcd. for $$[Co(C_{10}H_8N_2)_3](B_{10}H_{10})(ClO_4)$$

B, 14.52; Cl, 4.76; Co, 7.91; N, 11.28. Found: B, 12.54; Cl, 5.61, 5.68; Co, 7.08, 720; N, 10.88, 10.92.

The solid product exploded when struck a sharp blow by a hammer on a hard surface, when dropped on a heated surface, or when mixed with concentrated nitric acid.

The products and processes of this invention have been illustrated by the foregoing specific examples; however, the invention is generic to the products defined on pages 1–2 and the processes defined on pages 9–10. Additional examples of cobalt(III) and chromium(III) ammine polyhydropolyborate salts and the reactants from which they can be prepared are listed in Table I. The cobalt- and chromium-containing starting materials either are known compounds or can be prepared by modifications of procedures described in this application or in the literature. For convenience, all the reactants and products have been depicted in their anhydrous forms; it is to be understood, however, that hydrates of the reactants can be used, and that the products may be isolated from aqueous medium as hydrates.

A procedure somewhat similar to that of Example II may be used to prepare the products labeled XI–XVII in the table; while the general method of Example VII may be employed to obtain the products listed as XVIII–XXIV in the table. Product XXV is prepared by a method generally equivalent to that of Example X; and products XXVI–XXX may be produced by a process based on Example I.

TABLE I

| | Reactants | Product |
|---|---|---|
| XI | $[Co(NH_3)_5H_2O](NO_3)_3+(NH_4)_2B_{10}H_{10}$ | $[Co(NH_3)_5H_2O]_2(B_{10}H_{10})(NO_3)_4$ |
| XII | $[Co(NH_3)_5(BrO_3)](BrO_3)_2+Li_2B_{10}H_{10}$ | $[Co(NH_3)_5(BrO_3)]_2(B_{10}H_{10})(BrO_3)_2$ |
| XIII | $[Cr(NH_3)_6](ClO_2)_3+(NH_4)_2B_{10}H_{10}$ | $[Cr(NH_3)_6]_2(B_{10}H_{10})(ClO_2)_4$ |
| XIV | $[Co(NH_3)_5NO_3](NO_3)_2+(NH_4)_2B_{12}H_{12}$ | $[Co(NH_3)_5NO_3]_2(B_{12}H_{12})(NO_3)_2$ |
| XV | $[Co(NH_3)_6](IO_3)_3+Na_2B_{12}H_{12}$ | $[Co(NH_3)_6]_2(B_{12}H_{12})(IO_3)_4$ |
| XVI | $[Co(NH_3)_5NO_3](ClO_3)_2+K_2B_{10}H_{10}$ | $[Co(NH_3)_5NO_3]_2(B_{10}H_{10})(ClO_3)_2$ |
| XVII | $[Co(NH_3)_6](ClO_3)_3+K_2B_{10}H_{10}$ | $[Co(NH_3)_6]_2(B_{10}H_{10})(ClO_3)_4$ |
| XVIII | $\left[Co\left(\begin{array}{c}CH_2\\|\\CH_2\end{array}\begin{array}{c}CH_2\\ \diagdown \\ CH-NH_2\\|\\CH-NH_2\end{array}\right)_3\right](NO_3)_3+Na_2B_{12}H_{12}$ | $\left[Co\left(\begin{array}{c}CH_2\\|\\CH_2\end{array}\begin{array}{c}CH_2\\ \diagdown \\ CN-NH_2\\|\\CH-NH_2\end{array}\right)_3\right](B_{12}H_{12})(NO_3)$ |
| XIX | $[Cr(H_2NCH_2CH_2NH_2)_3](NO_3)_3+(NH_4)_2B_{12}H_{12}$ | $[Cr(H_2NCH_2CH_2NH_2)_3]_2(B_{12}H_{12})(NO_3)$ |
| XX | $[Co(H_2N\overset{CH_3}{\overset{|}{C}}HCH_2\overset{CH_3}{\overset{|}{C}}HNH_2)_3](NO_3)_3+Na_2B_{10}H_{10}$ | $[Co(H_2N\overset{CH_3}{\overset{|}{C}}HCH_2\overset{CH_3}{\overset{|}{C}}HNH_2)_3](B_{10}H_{10})(NO_3)$ |
| XXI | $[Co(NH_3)(H_2NCH_2CH_2NH_2)_2(H_2O)](NO_3)_3+Li_2B_{12}H_{12}$ | $[Co(NH_3)(H_2NCH_2CH_2NH_2)_2H_2O](B_{12}H_{12})(NO_3)$ |
| XXII | $\left[Co\left(\begin{array}{c}H_2N-\phantom{X}\\ \\ H_2N-\phantom{X}\end{array}\right)_3\right](NO_3)_3+K_2B_{10}H_{10}$ | $\left[Co\left(\begin{array}{c}H_2N-\phantom{X}\\ \\ H_2N-\phantom{X}\end{array}\right)_3\right](B_{10}H_{10})(NO_3)$ |
| XXIII | $[Cr(H_2NCH_2CH_2NH_2)_3]_2(Cr_2O_7)_3+(NH_4)_2B_{12}H_{12}$ | $[Cr(H_2NCH_2CH_2NH_2)_3]_2(B_{12}H_{12})(Cr_2O_7)_2$ |
| XIV | $[Co(H_2N\overset{CH_3}{\overset{|}{C}}HCH_2NH_2)_2(NH_3)_2](MnO_4)_3+Na_2B_{10}H_{10}$ | $[Co(H_2N\overset{CH_3}{\overset{|}{C}}HCH_2NH_2)_2(NH_3)_2](B_{10}H_{10})(MnO_4)$ |

TABLE I—Continued

| | Reactants | Product |
|---|---|---|
| XXV | 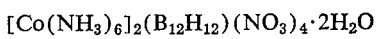$(NO_3)_3 + Li_2B_{10}H_{10}$ | 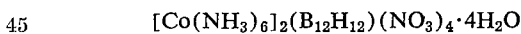$(B_{10}H_{10})(NO_3)$ |
| XXVI | $[Cr(H_2NCH_2CH_2NH_2)_2(H_2NCHCH_2NH_2)]_2(B_{12}H_{12})_3 + KNO_3$ 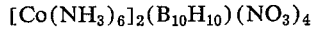 | $[Cr(H_2NCH_2CH_2NH_2)_2(H_2NCHCH_2NH_2)](B_{12}H_{12})(NO_3)$ 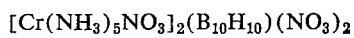 |
| XXVII | $[Co(H_2NCH-CHNH_2)_3]_2(B_{10}H_{10})_3 + NH_4NO_3$ 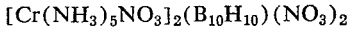 | $[Co(H_2NCH-CHNH_2)_3](B_{10}H_{10})(NO_3)$ 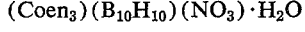 |
| XXVIII | $[Co(H_2NCHCH_2NH_2)_3]_2(B_{12}H_{12})_3 + Na_2CrO_4$ 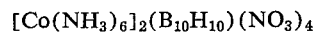 | $[Co(H_2NCHCH_2NH_2)_3]_2B_{12}H_{12}(CrO_4)_2$ 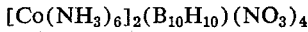 |
| XXIX | $[Cr(NH_3)_6]_2(B_{12}H_{12})_3 + NaIO_4$ | $[Cr(NH_3)_6](B_{12}H_{12})(IO_4)$ |
| XXX | $[Cr(NH_3)_6]_2(B_{10}H_{10})_3 + NaClO$ | $[Cr(NH_3)_6](B_{10}H_{10})(ClO)$ |

Utility of the products

The products of this invention are useful as explosives. They are especially useful as one or more of the active components of electric blasting caps.

A typical cap is shown in the accompanying drawing. It is constructed and charged as follows: The cap comprises a bronze shell 11, of length 1⅛ in., outer diameter 0.272 in., and average inner diameter 0.26 in. At the bottom of the shell, adjacent to the closed end, is loaded and pressed at 200 lbs. a base charge 12. Above the base charge is loaded and pressed at 200 lbs. a primer charge 13, and above the primer charge is inserted a loose (unpressed) ignition charge 14. A nickel/chromium (80/20) bridge wire 15 of resistance 1.37±0.50Ω, soldered to and connecting the terminals of the lead wires 16, is embedded in the igniting charge. The shell is sealed with a rubber plug 17, which also holds the lead wires firmly in position. The lead wires are ⅛ in. apart and project ⅛ in. below the bottom of the rubber plug. Alternatively, other conventional shell-sealing means can be used. After the cap is charged and the plug is inserted, three peripheral crimps 18 are made in the shell wall to seal the plug.

The following examples illustrate the use of the products of this invention as components of electric blasting caps.

EXAMPLE A

The cap described above was loaded with four grains of pressed $[Co(NH_3)_6]_2(B_{12}H_{12})(NO_3)_4 \cdot 2H_2O$ as the base charge, four grains of pressed lead azide as the primer charge, and four grains of loose (unpressed) "50/25/25" commercial ignition mixture (50% by weight smokeless powder, 25% lead salt of dinitro-o-cresol, and 25% potassium chlorate) as the ignition charge. The cap was placed with its bottom (the integrally closed end) against a ⅛ in. lead plate and detonated by passage of a 5-ampere current through the lead wires and the bridge wire. The detonation blew a hole in the lead plate of a size and pattern corresponding to good explosive activity for the cobalt salt as a base charge. Essentially the same result was obtained when $[Co(NH_3)_6]_2(B_{12}H_{12})(NO_3) \cdot 4H_2O$
$[Co(NH_3)_6]_2(B_{10}H_{10})(NO_3)_4$
$[Cr(NH_3)_5NO_3]_2(B_{10}H_{10})(NO_3)_2$ or $(Coen_3)(B_{10}H_{10})(NO_3) \cdot H_2O$ was substituted for $[Co(NH_3)_6]_2(B_{12}H_{12})(NO_3)_4 \cdot 2H_2O$ as the base charge in this test.

EXAMPLE B

The experiment of Example A was repeated, except that the cap was loaded with four grains of pressed PETN (pentaerythritol tetranitrate) as the base charge, four grains of pressed $[Cr(NH_3)_5NO_3]_2(B_{10}H_{10})(NO_3)_2$ as the primer charge, and four grains of the loose "50/25/25" commercial ignition mixture of Example A as the ignition charge. The detonation blew a hole in the lead plate of essentially the size and shape of the bottom of the cap, which result showed that the chromium compound had good activity as a primer charge. Similar results were obtained when $[Co(NH_3)_6]_2(B_{12}H_{12})(NO_3)_4 \cdot 2H_2O$ or $[Co(NH_3)_6]_2(B_{10}H_{10})(NO_3)_4$ was substituted for $[Cr(NH_3)_5NO_3]_2(B_{10}H_{10})(NO_3)_2$ as the primer charge in this test.

EXAMPLE C

The experiment of Example A was repeated with four grains of pressed PETN as the cap base charge, four grains of pressed lead azide as the primer charge, and four grains of loose $[Co(NH_3)_6]_2(B_{10}H_{10})(NO_3)_4$ as the ignition charge. The detonation blew a hole in the lead plate similar to that described in Example B, showing that the cobalt compound had good activity as an ignition charge for the electric blasting cap.

$[Co(NH_3)_6]_2(B_{12}H_{12})(NO_3)_4 \cdot 4H_2O$ the corresponding dihydrate $[Cr(NH_3)_5NO_3]_2(B_{10}H_{10})(NO_3)_2$ and $(Coen_3)(B_{10}H_{10})(NO_3) \cdot H_2O$ each gave essentially the same results when substituted for $[Co(NH_3)_6]_2(B_{10}H_{10})(NO_3)_4$ as the ignition charge in this test.

EXAMPLE D

The experiment of Example A was repeated, except that the cap contained four grains of pressed $[Co(NH_3)_6]_2(B_{10}H_{10})(NO_3)_4$ as the base charge, another four grains of the same compound (pressed) as the primer charge, and still another four grains of the same compound in loose form as the ignition charge. Detonation blew a hole in the lead plate of essentially the size and pattern of the one that resulted in Example A. Substitution of $[Cr(NH_3)_5NO_3]_2(B_{10}H_{10})(NO_3)_2$ or $[Co(NH_3)_6]_2(B_{12}H_{12})(NO_3)_4 \cdot 2H_2O$ for $[Co(NH_3)_6]_2(B_{10}H_{10})(NO_3)_4$ gave essentially the same result.

The results of Example D confirm what is shown by Examples A, B, and C, viz., that products of this invention not only are useful as explosives but moreover are exceptionally useful in electric blasting caps and other electrically actuated initiators and ignitors, in that they can function as base charges, primer charges, and/or ignition charges. This combination of functions is shown by only very few other compounds, e.g., mercury fulminate. It is significant that this combination of properties is not shown by complex cobalt and chromium ammine salts containing oxidizing anions but no polyhydropolyborate anions, e.g., $[Cr(NH_3)_6](NO_3)_3$, $[Co(NH_3)_6](NO_3)_3$, and $(Coen_3)(NO_3)_3$, which have long been known to be explosive under certain conditions (see, for example, Tomlinson et al., J. Am. Chem. Soc. 71, 375 (1949)). Furthermore, the cobalt and chromium ammine salts containing no polyhydropolyborate anions are much less powerful explosives than the products of the present invention when used as single components of blasting caps, i.e., as base chargers, primer charges, or ignition charges. This is shown conclusively by the fact that when $$[Cr(NH_3)_6](NO_3)_3$$
$$[Co(NH_3)_6](NO_3)_3$$
$$(Coen_3)(NO_3)_3$$
$$(Cobipy_3)(ClO_4)_3 \cdot 3H_2O$$

or $$[Co(NH_3)_6](NO_3)(CrO_4)$$

was used as the test compound in any of examples A, B, or C, no hole at all was blown in the lead plate when the cap was detonated.

As many apparently widely different embodiments of this invention may be made without departing from the spirit and scope thereof, it is to be understood that this invention is not limited to the specific embodiments thereof shown herein.

The embodiments of the invention in which an exclusive property or privilege is claimed are defined as follows:

1. Compounds selected from the class consisting of
   I. compounds of the formula $$[ML_{6-n-p}(H_2O)_n(A)_p]_s(B_qH_q)(A)_r$$

wherein (1) the bracketed moiety represents a metal ammine cation in which M is selected from the class consisting of trivalent hexacoordinated cobalt and trivalent hexacoordinated chromium; L represents a ligand selected from the class consisting of ammonia, monoprimary amines, heterocyclic amines, saturated acyclic 1,2- and 1,3-diprimary amines of 2–5 carbon atoms, saturated alicyclic 1,2-diprimary amines, aromatic 1,2-diprimary amines, heterocyclic 1,2-ditertiary amines and saturated aliphatic straight-chain tri- and tetramines; $n$ is a whole number of from 0 to 1, inclusive, and represents the number of coordinated water ($H_2O$) molecules in the cation; $p$ is a whole number of from 0 to 1, inclusive, and represents the number of coordinated A anions in the cation; the sum of $n$ and $p$ at most is 1; and $s$ is a whole number of 1 to 2, inclusive, and represents the number of cation entities present;

(2) the entity $(B_qH_q)$ represents a divalent polyhydropolyborate anion in which $q$ is a whole number selected from the class consisting of 10 and 12; and (3) A represents an anion derived from an oxy-acid of an element selected from the groups of the Periodic Table consisting of Groups VA, VIB, VIIA and VIIB; and $r$ represents the number of A groups in the compound outside the metal amine cation and is a whole number of from 0 to four, inclusive, which is determined by the formula $$r = \frac{s(3-pa)-2}{a}$$

wherein $a$ is the valence of the anion A and the remaining letters are defined as above, with the proviso that $(r+p)$ is greater than zero; and
II. hydrates thereof.

2. The compounds of claim 1 wherein L is selected from the class consisting of ammonia, saturated acyclic 1,2-diprimary amines of 2–5 carbons, o-phenylenediamine, 2,2'-bipyridyl and o-phenanthroline; and A is selected from the class consisting of nitrate, chromate, dichromate, permanganate, hypochlorite, chlorite, chlorate, bromate, iodate, perchlorate and periodate.

3. Hexamminecobalt(III) dodecahydrododecaborate nitrate dihydrate.

4. Tris(ethylenediamine)cobalt(III) decahydrodecaborate nitrate monohydrate.

5. Tris(2,2'-bipyridyl)cobalt(III) decahydrodecaborate perchlorate.

6. Di[hexamminecobalt(III)] decahydrodecaborate bischromate.

7. A product having the formula $$Cr_2(NH_3)_{10}(NO_3)_4B_{10}H_{10}$$

said product being formed by the process of reacting $[Cr(NH_3)_6](NO_3)_3$ with a salt selected from the class consisting of ammonium and alkali metal decahydrodecaborates and isolating the resulting product.

8. Process which comprises reacting a metal ammine salt in which the metal is selected from the class consisting of chromium and cobalt in the hexacoordinated trivalent state, wherein the ammine ligand is selected from the class consisting of ammonia and amines and the anions of said salt are oxidizing anions with a reduction potential of at least 0.5 v., with a polyhydropolyborate salt wherein the cation is selected from the class consisting of ammonium and alkali metal, and the anion is selected from the class consisting of $B_{10}H_{10}^=$ and $B_{12}H_{12}^=$ and isolating the resulting product consisting of a double salt having cations of a metal ammine, an anion selected from $B_{10}H_{10}^=$ and $B_{12}H_{12}^=$ and at least one oxidizing anion with a reduction potential of at least 0.5 v.

9. Process which comprises reacting a metal ammine salt wherein the metal is selected from the class consisting of chromium and cobalt in the hexacoordinated trivalent state, wherein the ammine ligand is selected from the class consisting of ammonia and amines and the anion of said salt is selected from the class consisting of $B_{10}H_{10}^=$ and $B_{12}H_{12}^=$, with a salt wherein the cation is selected from the class consisting of ammonium and alkali metal and the anion is an oxidizing anion with a reduction potential of at least 0.5 v., and isolating the resulting product consisting of a double salt having cations of a metal ammine, an anion selected from $B_{10}H_{10}^=$ and $B_{12}H_{12}^=$ and at least one oxidizing anion with a reduction potential of at least 0.5 v.

References Cited

UNITED STATES PATENTS

| 3,107,613 | 10/1963 | Armstrong et al. | 23—14 X |
| 3,126,305 | 3/1964 | Armstrong | 23—14 X |
| 3,148,939 | 9/1964 | Knoth | 23—14 |
| 3,169,045 | 2/1965 | Miller et al. | 23—14 |
| 3,184,286 | 5/1965 | England | 23—14 |
| 3,256,056 | 6/1966 | Armstrong | 23—361 |

FOREIGN PATENTS 613,367    1/1961    Canada.

OSCAR R. VERTIZ, *Primary Examiner.*